US010509588B2

(12) United States Patent
Gadelrab et al.

(10) Patent No.: US 10,509,588 B2
(45) Date of Patent: Dec. 17, 2019

(54) SYSTEM AND METHOD FOR CONTROLLING MEMORY FREQUENCY USING FEED-FORWARD COMPRESSION STATISTICS

(71) Applicant: QUALCOMM INCORPORATED, San Diego, CA (US)

(72) Inventors: Serag Gadelrab, Markham (CA); Sudeep Ravi Kottilingal, San Diego, CA (US); Meghal Varia, Brampton (CA); Pooja Sinha, Markham (CA); Ujwal Patel, San Diego, CA (US); Ruo Long Liu, Markham (CA); Jeffrey Chu, San Diego, CA (US); Sina Gholamian, Markham (CA); Hyukjune Chung, San Diego, CA (US); David Strasser, Toronto (CA); Raghavendra Nagaraj, San Diego, CA (US); Eric Demers, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 644 days.

(21) Appl. No.: 14/995,125

(22) Filed: Jan. 13, 2016

(65) Prior Publication Data

US 2017/0083262 A1 Mar. 23, 2017

Related U.S. Application Data

(60) Provisional application No. 62/220,451, filed on Sep. 18, 2015.

(51) Int. Cl.
*G06F 3/06* (2006.01)
*G06F 13/16* (2006.01)
(Continued)

(52) U.S. Cl.
CPC ............ *G06F 3/0656* (2013.01); *G06F 1/324* (2013.01); *G06F 1/3275* (2013.01);
(Continued)

(58) Field of Classification Search
None
See application file for complete search history.

(56) References Cited

U.S. PATENT DOCUMENTS

| 5,666,460 A | * | 9/1997 | Ohta | G11L 319/00 386/314 |
| 7,009,533 B1 | * | 3/2006 | Wegener | H04N 1/413 341/76 |

(Continued)

OTHER PUBLICATIONS

International Search Report and Written Opinion—PCT/US2016/048031—ISA/EPO—dated Nov. 21, 2016.

*Primary Examiner* — Prasith Thammavong
*Assistant Examiner* — Alex G Olson
(74) *Attorney, Agent, or Firm* — Smith Tempel Blaha LLC

(57) ABSTRACT

Systems, methods, and computer programs are disclosed for controlling memory frequency. One method comprises a first memory client generating a compressed data buffer and compression statistics related to the compressed data buffer. The compressed data buffer and the compression statistics are stored in a memory device. Based on the stored compression statistics, a frequency or voltage setting of the memory device is adjusted for enabling a second memory client to read the compressed data buffer.

17 Claims, 15 Drawing Sheets

(51) Int. Cl.
    *G06F 1/324*         (2019.01)
    *G06F 1/3296*       (2019.01)
    *G06F 1/3234*       (2019.01)

(52) U.S. Cl.
    CPC .......... *G06F 1/3296* (2013.01); *G06F 3/0613* (2013.01); *G06F 3/0661* (2013.01); *G06F 3/0683* (2013.01); *G06F 13/1673* (2013.01); *Y02D 10/126* (2018.01); *Y02D 10/13* (2018.01); *Y02D 10/14* (2018.01); *Y02D 10/172* (2018.01)

(56) References Cited

U.S. PATENT DOCUMENTS

| | | | |
|---|---|---|---|
| 7,024,045 | B2 | 4/2006 | McIntyre |
| 7,190,284 | B1 | 3/2007 | Dye et al. |
| 7,876,252 | B1 | 1/2011 | Wegener |
| 8,225,112 | B2 | 7/2012 | Koul et al. |
| 8,645,338 | B2 | 2/2014 | Barsness et al. |
| 2003/0156652 | A1* | 8/2003 | Wise .................... G06F 9/3867 375/240.26 |
| 2006/0117268 | A1* | 6/2006 | Talley ................... G06F 17/212 715/769 |
| 2008/0084925 | A1* | 4/2008 | Rozen .................. H04N 19/176 375/240.01 |
| 2010/0058086 | A1* | 3/2010 | Lee ....................... G06F 1/3203 713/322 |
| 2013/0080795 | A1 | 3/2013 | Sistla et al. |
| 2013/0215016 | A1* | 8/2013 | Moriyoshi ............. H04N 19/85 345/156 |
| 2013/0243100 | A1 | 9/2013 | Liu et al. |
| 2013/0262894 | A1 | 10/2013 | Lee et al. |
| 2014/0192075 | A1 | 7/2014 | Stamoulis et al. |
| 2014/0198838 | A1* | 7/2014 | Andrysco ............ H04N 19/172 375/240.1 |
| 2014/0376618 | A1 | 12/2014 | Ma et al. |
| 2015/0106649 | A1 | 4/2015 | Kannan |
| 2015/0163496 | A1 | 6/2015 | Singer et al. |
| 2015/0178214 | A1* | 6/2015 | Alameldeen ........ G06F 12/0875 711/125 |

\* cited by examiner

SYSTEM AND METHOD FOR CONTROLLING MEMORY FREQUENCY USING FEED-FORWARD COMPRESSION STATISTICS

CROSS REFERENCE TO RELATED APPLICATION

This application claims priority under 35 U.S.C. § 119(e) to U.S. Non-Provisional Patent Application Ser. No. 62/220,451, filed Sep. 18, 2015, entitled, "SYSTEM AND METHOD FOR CONTROLLING MEMORY FREQUENCY USING FEED-FORWARD COMPRESSION STATISTICS." The entire contents of which are hereby incorporated by reference.

BACKGROUND

Portable computing devices (e.g., cellular telephones, smartphones, tablet computers, portable digital assistants (PDAs), portable game consoles, wearable devices, and other battery-powered devices) and other computing devices continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.). The SoC may be coupled to one or more volatile memory modules or devices, such as, dynamic random access memory (DRAM) via double data rate (DDR) high-performance data and control interface(s).

Memory, memory bus, and system interconnect power may be a significant source of system power consumption. As known in the art, memory, memory bus, and system interconnect power is a function of the frequency of operation. Higher frequency produces more power consumption. The frequencies of the memory, memory bus and on-chip interconnect are a function of the bandwidth required by each memory client in the system.

In current SoC systems, the operating frequencies of the memory, memory bus, and system interconnect are typically set according to use cases based on a required bandwidth for each use case. The required bandwidth determines the frequencies and the SoC voltage corner used for the SOC, the volatile memory, and associated bus. Frequency and/or voltage settings for providing the required bandwidth translate to a memory and SOC power cost. In existing systems, hardware and/or software is used to dynamically change required frequencies and voltages based on use case.

Two methods are typically used to set a memory bandwidth vote according to use cases. Each method, however, suffers from the tradeoff limitation between conserving memory and SOC power or maintaining desirable performance. In a first method, a memory bandwidth vote is based on a known worst-case (highest) required bandwidth, which may not reap the benefit of frequency and/or voltage savings. In a second method, the memory bandwidth vote is based on an estimated typical (or average) bandwidth. If the estimated bandwidth is too optimistic, the actual bandwidth may exceed system bandwidth, resulting in degradation in performance. If the estimated bandwidth is too pessimistic, the system may not reap the benefit of voltage savings.

Accordingly, there is a need for systems and methods for controlling memory, memory bus, and/or system interconnect frequency with improved power and performance.

SUMMARY OF THE DISCLOSURE

Systems, methods, and computer programs are disclosed for controlling one or more of a memory, a memory bus, and a system interconnect frequency. One embodiment of a method comprises a first memory client generating a compressed data buffer and compression statistics related to the compressed data buffer. The compressed data buffer and the compression statistics are stored in a memory device. Based on the stored compression statistics, a frequency or voltage setting of one of the memory device, a memory bus, and a system interconnect are adjusted for enabling a second memory client to read the compressed data buffer.

Another embodiment is a system comprising a first memory client, a second memory client, and memory device. The first memory client is configured to produce a compressed data buffer and compression statistics related to the compressed data buffer. The memory device stores the compressed data buffer and the compression statistics. The second memory client is configured to use the compression statistics to accurately vote for a memory bandwidth to consume the compressed data buffer.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
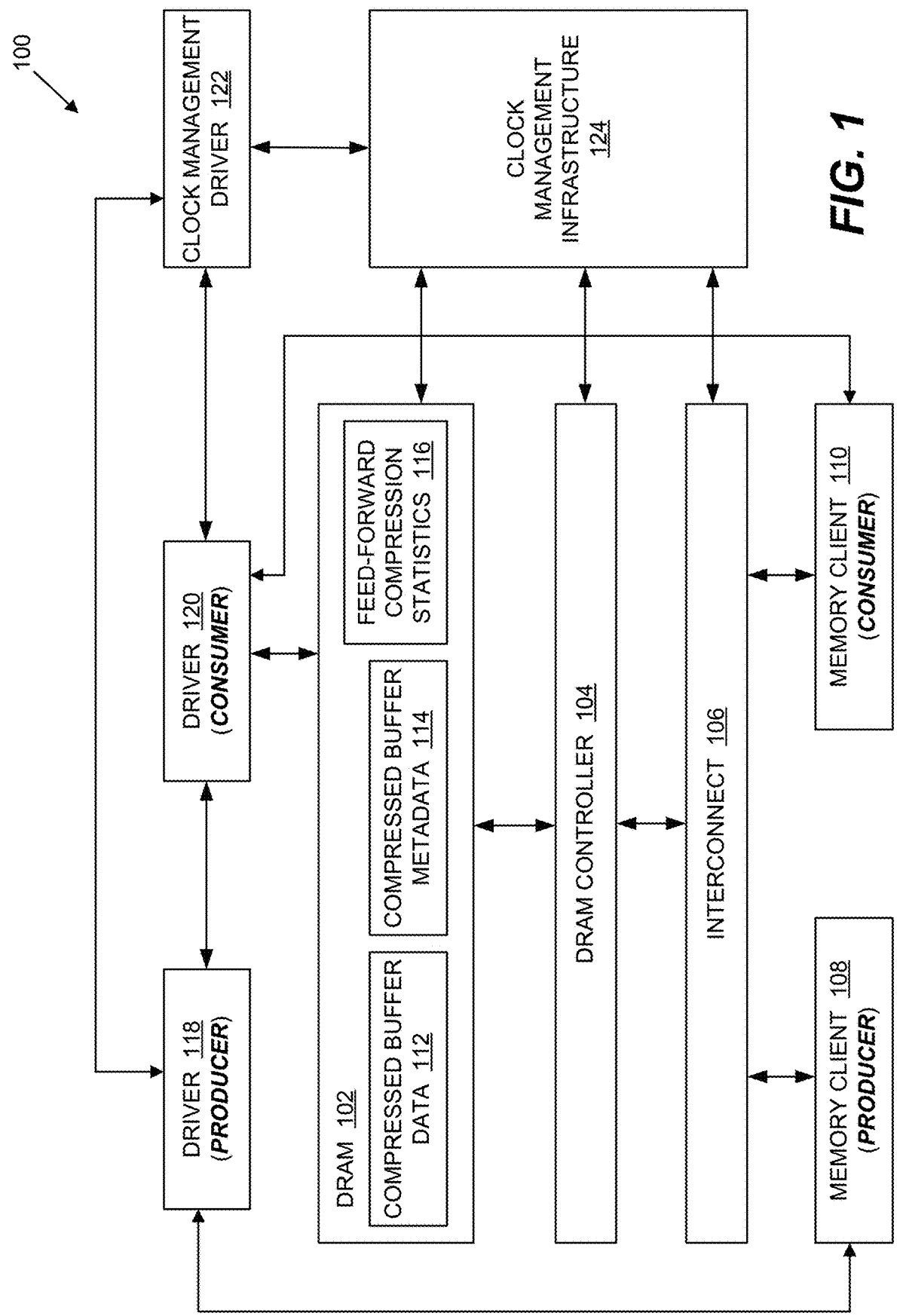
FIG. 1 is a block diagram of an embodiment of a system for controlling the frequency of a volatile memory device using feed-forward compression statistics.

FIG. 1 illustrates an exemplary embodiment of a system 100 for controlling memory, memory bus, and/or on-chip interconnect frequency using feed-forward compression or size statistics. The system 100 may be incorporated in various types of computing devices (e.g., servers, desktop or laptop personal computers, tablet computers, smartphones, portable game consoles, etc.) and other electronic components, packages, and devices. The system 100 comprises one or more processors that request memory resources (e.g., read and write operations) from a volatile or non-volatile memory, which may reside within or outside the SOC, such as dynamic random access memory (DRAM) 102. The memory clients may comprise one or more processing cores or units (e.g., a central processing unit (CPU), a graphics processing unit (GPU), a digital signal processor (DSP), a video processor, a modem processor, a display processor, etc.) or any other clients requesting read/write access to the DRAM 102. The memory clients may comprise real-time clients (e.g., used for a display, camera, etc.) or non-real-time clients (e.g., used for video encoding, image post-processing, etc.). The memory clients may have a requirement for a fixed bandwidth per task and/or a variable bandwidth requirement per task.

In general, the system 100 leverages the use of variable memory bandwidth needs by clients (either natively or due to compression) to reduce memory client bandwidth voting and, therefore, reduce memory frequency and potentially reduce the operating voltage, which may advantageously reduce power consumption without compromising performance. As illustrated in FIG. 1, the memory clients may comprise one or more producer memory clients 108 and consumer memory clients 110. Memory clients 108 and 110 may be electrically coupled to a system interconnect 106. The system interconnect 106 may be electrically coupled to a DRAM controller 104, which is in turn electrically coupled to the DRAM 102 via system interconnect 106 and a memory bus. The system 100 further comprises a clock and voltage management infrastructure 124, which controls one or more clock generators associated with the operation of the DRAM 102, the DRAM controller 104, and the system interconnect 106.

Producer memory clients 108 create compressed buffers stored in DRAM 102 using one or more compression algorithms. In an embodiment, the compression algorithms provide lossless or lossy compression for enabling the original data to be reconstructed from the compressed data. Exemplary embodiments of lossless compression methods include Portable Network Graphics (PNG), Free lossless Audio Codec (FLAC), H264 Lossless. Exemplary embodiments of lossy compression methods that provide variable compression ratio include H264 (lossy), JPEG, and, MP3.

A compressed buffer comprises compressed buffer data 112, compressed buffer metadata 114, and feed-forward compression statistics 116. Compressed buffer data 112 stores the compressed data, which may comprise a plurality of image frames or buffers logically divided into a plurality of compression units. A compression unit may have a fixed number of bytes (e.g., 128 bytes). A hardware and/or software compressor block compresses each unit in an image frame and generates a compressed frame. In lossless compression, each compression unit may be compressed to a minimum possible size without loss of features (i.e., may be later decompressed to produce identical data to an uncompressed unit). In lossy compression, each compression unit may be compressed to either a fixed size, or to a size that minimizes the loss of features. In an embodiment, each compression unit in an image frame may be of a fixed size, K bytes. After compression, the size of each unit may vary based on the level of compression (i.e., compression ratio).

A compression unit of K bytes may indicate that no compression was possible, in which case the compressed and uncompressed units are identical. Compression units of (K−1), (K−2), or (K−n) bytes, for example, may indicate increasing levels of compression.

As further illustrated in FIG. 1, the compressor block associated with a producer memory client 108 also generates a companion buffer (i.e., compressed buffer metadata 114). Compressed buffer metadata 114 comprises data identifying the post-compression size, as well as, type, and/or attributes of each compression unit. Feed-forward compression statistics 116 comprise data related to, for example, the compression ratio associated with the image frames and/or the compression units in each image frame. As described below in more detail, feed-forward compression statistics 116 may be generated by the producer memory client 108 and then stored in DRAM 102. In alternative embodiments, either the software driver of the producer memory client 118 or the software driver of the the consumer memory clients driver 120 may generate the feed-forward compression statistics 116 by accessing and processing the compressed buffer metadata 114.

The exemplary embodiment of FIG. 1 shows the compressor block as embedded within a producer memory client 108. In another embodiments, the compressor unit may be embedded within the system interconnect 106 or the DRAM controller 104. In yet another embodiment, the compressor block embedded in the interconnect 106 or the DRAM controller 104 may be shared between multiple producer memory clients 108 where the compressor block is allocated to the use of each producer memory client 108 on a time-division multiplex manner.

The consumer memory clients 110 may use the feed-forward compression statistics 116 to accurately vote for the memory bandwidth needed to consume the corresponding compressed buffer from DRAM 102. The memory bandwidth votes may be provided to the clock and voltage management infrastructure 124. In this manner, the frequency settings of the DRAM 102, DRAM controller 104, and/or system interconnect 106 may be adjusted based on the feed-forward compression statistics 116. The more accurate and potentially lower bandwidth votes may result in reduced DRAM and/or interconnect power consumption. Furthermore, reductions to the frequency of the DRAM 102, DRAM controller 104, and/or system interconnect 106 may allow a reduction in the operating voltage of these components, which may further reduce overall power consumption of the system by reducing the overall leakage current. It should be appreciated that the bandwidth voting based on the feed-forward compression statistics 116 may be implemented using software and/or hardware. In software embodiments, the producer memory client 108, the consumer memory client 110, and the clock and voltage management infrastructure 124 may have corresponding software drivers 118, 120, and 122, respectively.

Figure 2:
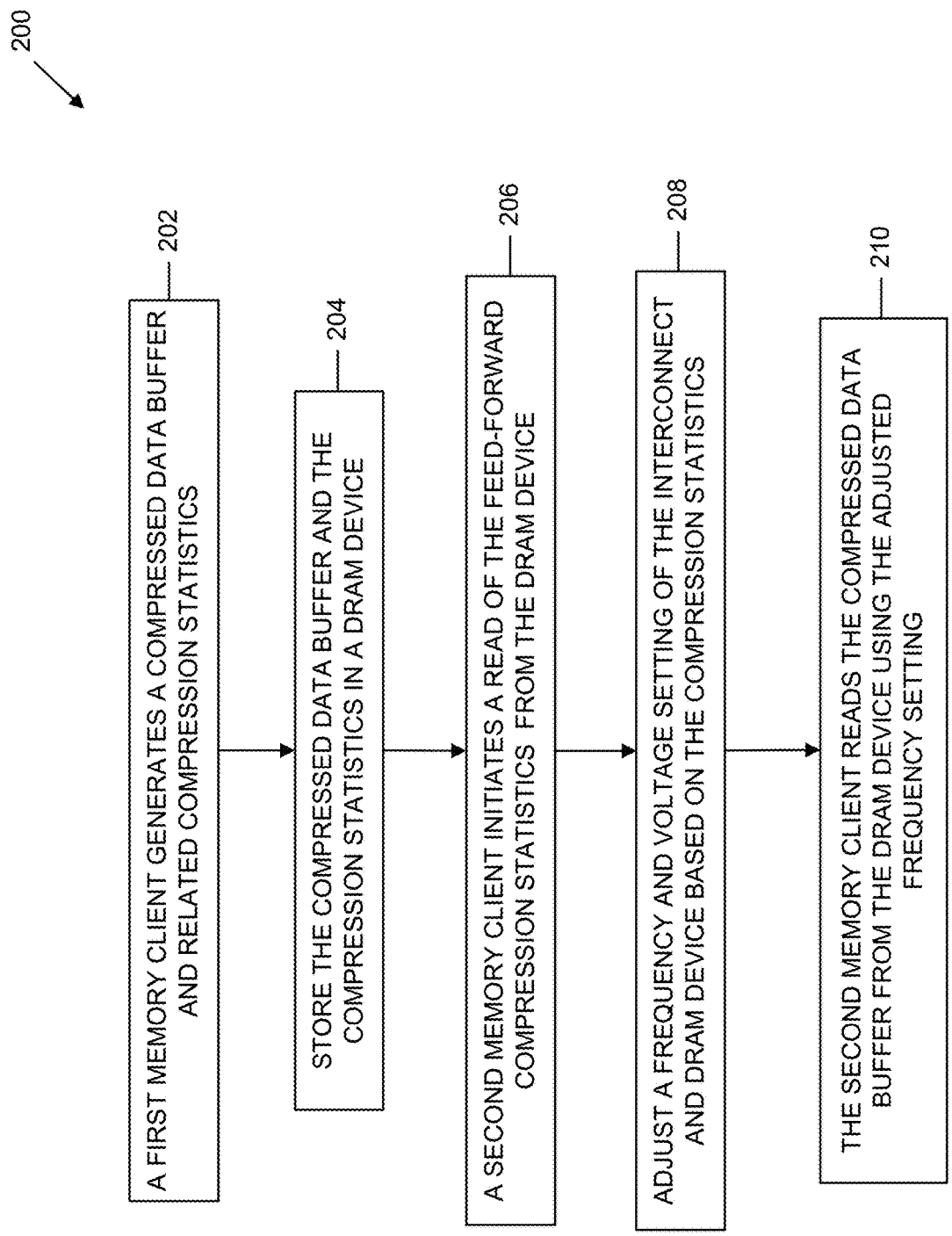
FIG. 2 is a flowchart illustrating an embodiment of a method implemented in the system of FIG. 1.

FIG. 2 is a flowchart illustrating an embodiment of a method implemented in the system of FIG. 1 for controlling the frequency of DRAM 102, DRAM controller 104, and/or system interconnect 106 using feed-forward compression statistics 116. At block 202, a first memory client (e.g., producer memory client 108) receives uncompressed source data. A bandwidth compression algorithm compresses the source data and generates compressed buffer data 112, compressed buffer metadata 114, and related feed-forward compression statistics 116. At block 204, the compressed buffer data 112, compressed buffer metadata 114, and feed-forward compression statistics 116 are stored in DRAM 102.

At block 206, a second memory client (e.g., consumer memory client 110) initiates a read of the compressed buffer from DRAM 102 by reading the feed-forward compression statistics 116. At block 208, a frequency setting and voltage levels of DRAM 102, DRAM controller 104, and/or system interconnect 106 may be adjusted based on the feed-forward compression statistics 116. At block 208, the second memory client reads the compressed buffer data 112 using the adjusted frequency setting.

Figure 3:
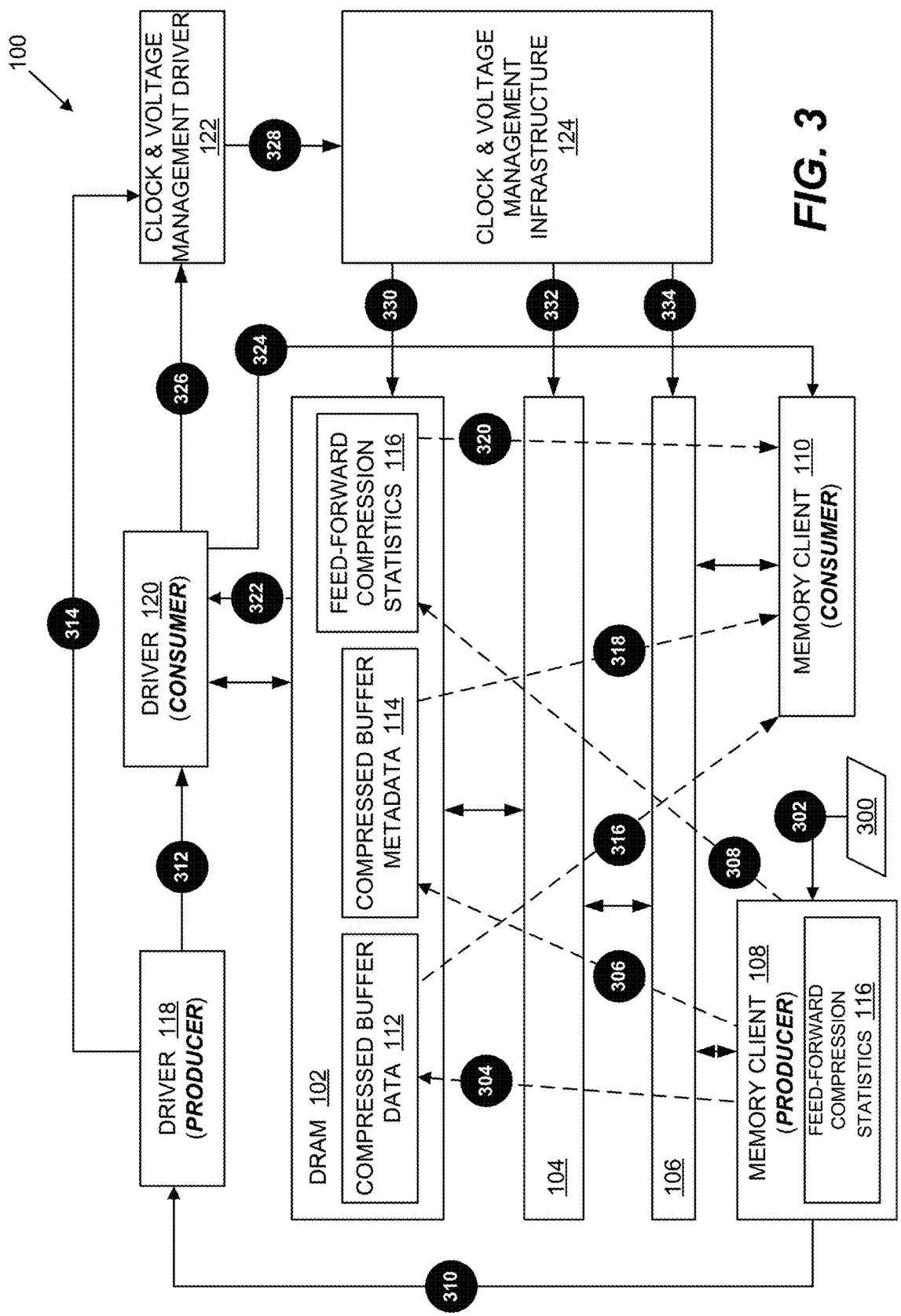
FIG. 3 is a combined block/flow diagram illustrating another embodiment of a system for controlling the frequency of a DRAM using feed-forward compression statistics.

FIG. 3 illustrates another embodiment of a method implemented in system 100 for controlling the frequency and voltage of DRAM 102, DRAM controller 104, and/or system interconnect 106 using feed-forward compression statistics 116. The producer memory client 108 receives source data 300 at step 302. The source data 300 may be generated by the producer memory client 108 or received from an external source or read from the DRAM 102. At step 304, the producer memory client 108 compresses the source data 300, generates a compressed buffer, and stores compressed buffer data 112 in DRAM 102. At step 306, compressed buffer metadata 114 is generated and stored in DRAM 102. At step 308, feed-forward compression statistics 116 are generated and stored in DRAM 102. It should be appreciated that steps 304, 306, and 308 may occur concurrently or sequentially. At step 310, the producer memory client 108 may instruct the producer driver 118 when produced frame(s) are ready. At step 312, the producer driver 118 may instruct the consumer driver 120 when compressed frame(s) are ready for consumption by the consumer memory client 110. At step 314, the producer driver 118 may provide a memory bandwidth vote to the clock management driver 122 representing future bandwidth consumption expectations for producer memory client 108.

In response to step 312, the consumer driver 120 may instruct the consumer memory client 110 to read compressed frames (step 324). The consumer memory client 110 may access the compressed buffer metadata 114 and the feed-forward compression statistics 116 (steps 318 and 320). In accordance with the feed-forward compression statistics 116, the consumer driver 120 may generate and submit an accurate bandwidth vote to the clock management driver 122 (step 326). The clock management driver 122 may aggregate the bandwidth votes from a plurality of sources and convert the aggregated bandwidth votes to corresponding frequency setting(s). The frequency setting(s) may be submitted to the clock and voltage management infrastructure 124 (step 328). At steps 330, 332 and 334, the clock and voltage management infrastructure 124 may control one or more clock generators at the adjusted frequency setting(s). The clock and voltage management infrastructure 124 may also control the voltage setting to match the required frequency settings. At step 316, the consumer memory client 110 reads the compressed buffer data 112 from DRAM 102.

Figure 4:
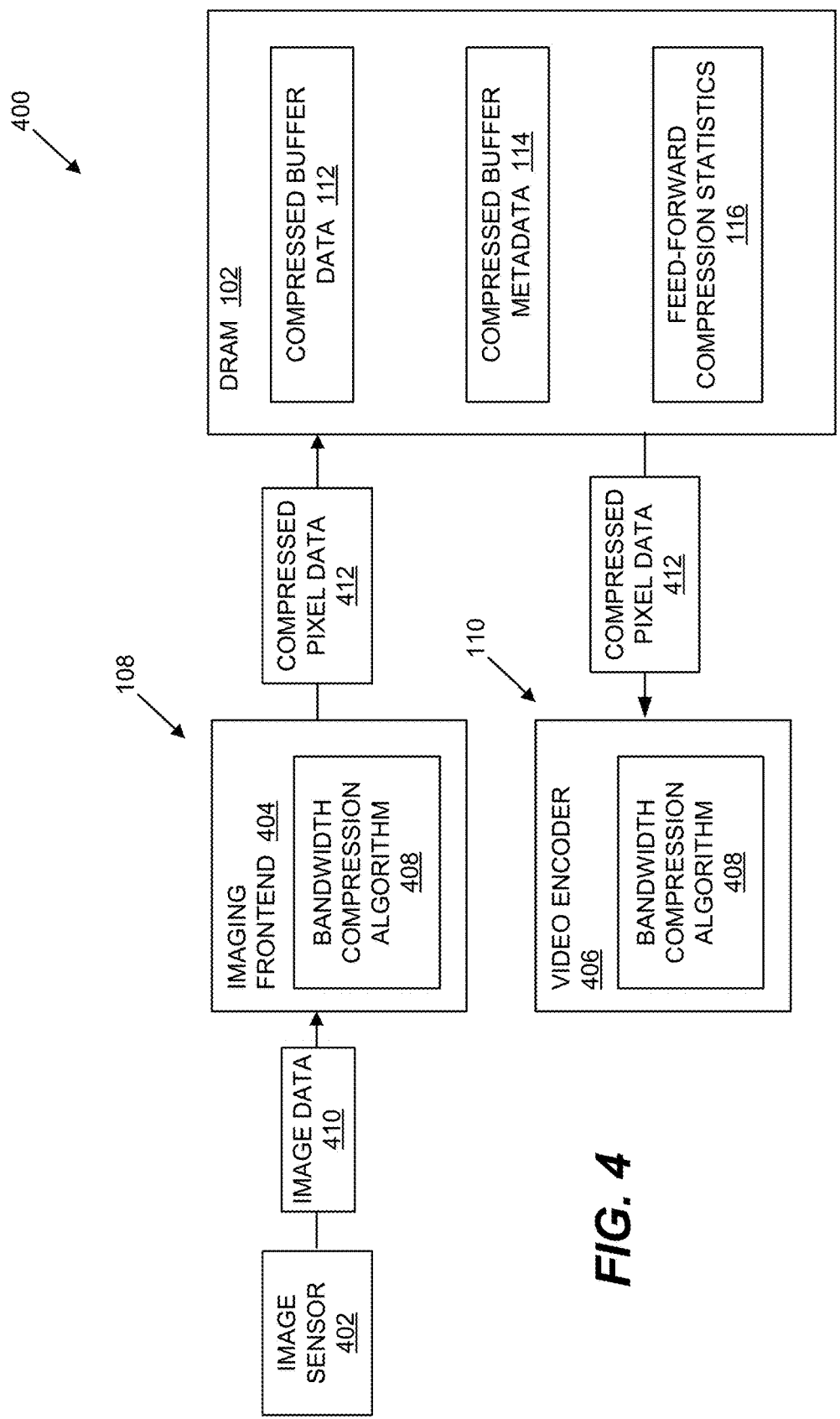
FIG. 4 illustrates an exemplary implementation of the system of FIG. 1 in which the producer memory client comprises an imaging frontend and the consumer memory client comprises a video encoder.

FIG. 4 illustrates an exemplary implementation of a system 400 in which the producer memory client 108 comprises an imaging frontend 404 and the consumer memory client 110 comprises a video encoder 406. In operation, a user of a smartphone may decide to record video and launch a video recording application. System 400 may set an initial bandwidth vote for DRAM 102, DRAM controller 104, and/or system interconnect 106. This may be based on, for example, a worst-case or typical bandwidth expected for a given image resolution for the blocks within the system 400 requiring access to DRAM 102. The initial bandwidth vote may set the system 400 into a voltage/frequency corner that is predetermined to meet the typical or worst-case DRAM bandwidth requirements. The user may initiate recording video via the video recording application. An image sensor 402 may provide image data 410 to the imaging frontend 404.

A bandwidth compression algorithm 408 compresses the image data 410 captured from the image sensor 402 and writes compressed pixel data 412 to DRAM 102. As the compressed pixel data 412 is written to DRAM 102 to be consumed by the video encoder 406, the amount of data written may be logged for each frame. The contents of the image being captured along with configuration data (e.g., frame skip, compression statistics) determine the number of bytes written to DRAM 102.

Figure 5:
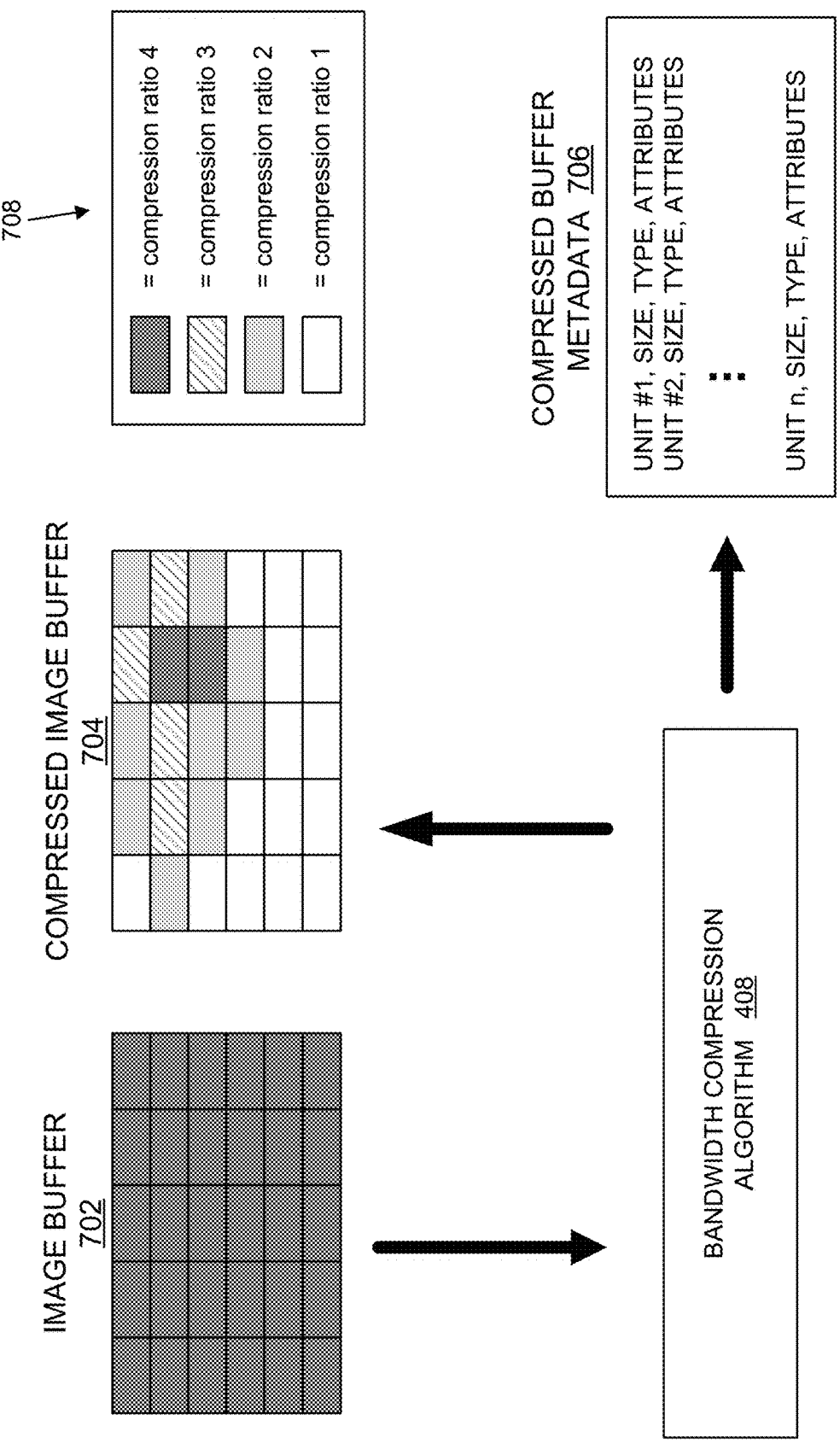
FIG. 5 is combined block/flow diagram illustrating an embodiment of a bandwidth compression algorithm implemented by a producer memory client.

FIG. 5 is combined block/flow diagram illustrating an embodiment of a bandwidth compression algorithm 408 implemented by a producer memory client 108. Uncompressed image buffer(s) 702 are received as input by the bandwidth compression algorithm 408. As described above, an uncompressed image buffer 702 may comprise a plurality of fixed-size units (illustrated as dark grey cells in uncompressed image buffer 702). The bandwidth compression algorithm 408 generates a compressed image buffer 704. Based on the nature of the uncompressed data and the compression algorithm, the fixed-sized units from the uncompressed image buffer 702 may be compressed into variable-sized compression units in compressed image buffer 702. Legend 708 illustrates and example of four different compression ratios. In other embodiments, the number of compression ratios maybe more than or less than the exemplary 4 levels. Compression units having a compression ratio 1 are illustrated as white cells and have the highest compression ratio. Compression units having a compression ratio 2 are illustrated as light grey cells and have the second highest compression ratio. Compression units having a compression ratio 3 are illustrated as hashed cells and have the lowest compression ratio. Compression ratio 4 corresponds to uncompressed units (illustrated as dark grey cells).

Figure 6:
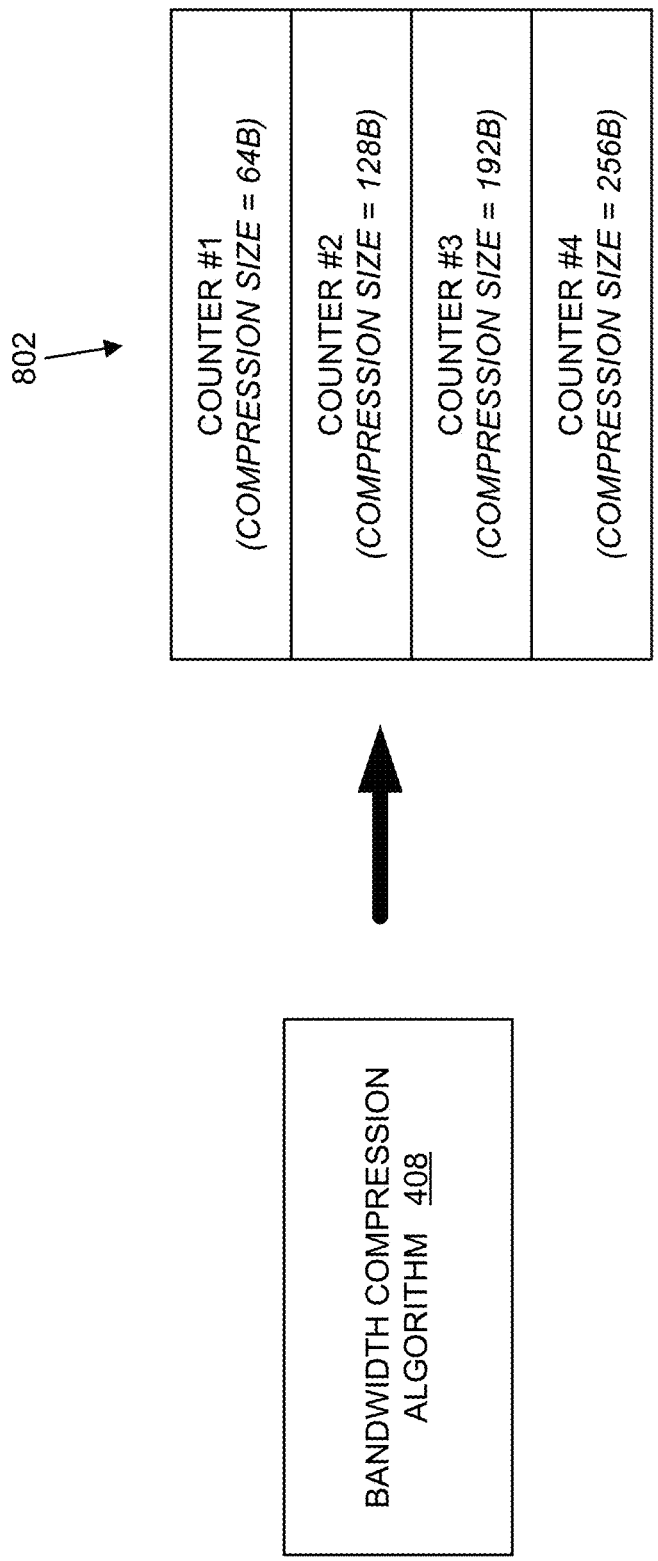
FIG. 6 illustrates another embodiment of the bandwidth compression algorithm of FIG. 5, which incorporates a plurality of compression size counters.

As further illustrated in FIG. 5, the bandwidth compression algorithm 408 also generates compressed buffer metadata 706. In an embodiment, the compressed buffer metadata 706 comprises data identifying each compression unit (e.g., units #1, #2, n) along with a corresponding size, compression type, compression attributes, etc. As illustrated in FIG. 6, the bandwidth compression algorithm 408 may comprise a plurality of compression size counters 802 for determining how many compression units are compressed at a predetermined compression size. Counter #1 keeps track of how many compression units are compressed at a first compression size (K/4 bytes). Counter #2 keeps track of how many compression units are compressed at a second compression size (K/2 bytes). Counter #3 keeps track of how many compression units are compressed at a third compression size (3K/4 bytes). Counter #4 keeps track of how many units are compressed at a fourth compression size (K bytes) or were not compressed at all. The content of the counter 802 for a given frame represents the feed-forward statistics 116 of that frame. The compressed buffer metadata 706 may be used as input for generating the feed-through compression statistics 116. In other embodiments, the compressed buffer metadata 706 may be used by a consumer memory client 110 to generate the feed-through compression statistics 116.

It should be appreciated that the above-described systems, methods, voting algorithms, and bandwidth compression algorithms may be used with real-time and/or non-real-time memory clients. Some memory clients may both produce and consume compressed buffers. In an embodiment, real-time cores may dynamically vote for a lower memory bandwidth when possible without failing. Non-real-time cores may deploy an adaptive voting scheme that uses per-frame metrics such as, for example, feed-forward compression ratio, completion time, complexity, measured compression ratio, # of buffered frames, etc. to dynamically adjust the bandwidth vote to a lowest-feasible value while meeting key performance indicators.

To drive these and other algorithms, memory clients that produce compressed frames may create the feed-forward compression statistics, as described above. In an embodiment, the feed-forward compression statistics 116 comprise per-frame data showing the compression ratio of each produced frame or buffer. Statistics may be gathered as N counters (FIG. 6) each of which represent a number of compressed units in the frame that were compressed to predetermined sizes. The N counters may be determined where N=size of uncompressed unit/DRAM Minimum Access Block Size (MABS). Counter #1 may count the number of units that were compressed to a size of less than or equal to 1 MABS. Counter #2 may count a number of units that were compressed to a size >1*MABS but <=2*ABS. Counter #3 may count a number of units that were compressed to a size >2*MABS but <=3*MABS. Counter #N may count a number of units that were compressed to a size >(N−1)*MABS but <=N*MABS. For example, if the unit size is 128 bytes and the DRAM MABS=32 bytes, the system may comprise 4 counters (N=4). Where N=4, the counters 1, 2, 3, and 4 may have size ranges <32 bytes, 33-64 bytes, 65-96 bytes, and 97-128 bytes, respectively. If producer memory clients 108 are not able to produce the N counts, another implementation may comprise a software component configured to parse the compressed buffer metadata 114 and create the counter #1 to #N as described above.

Figure 7:
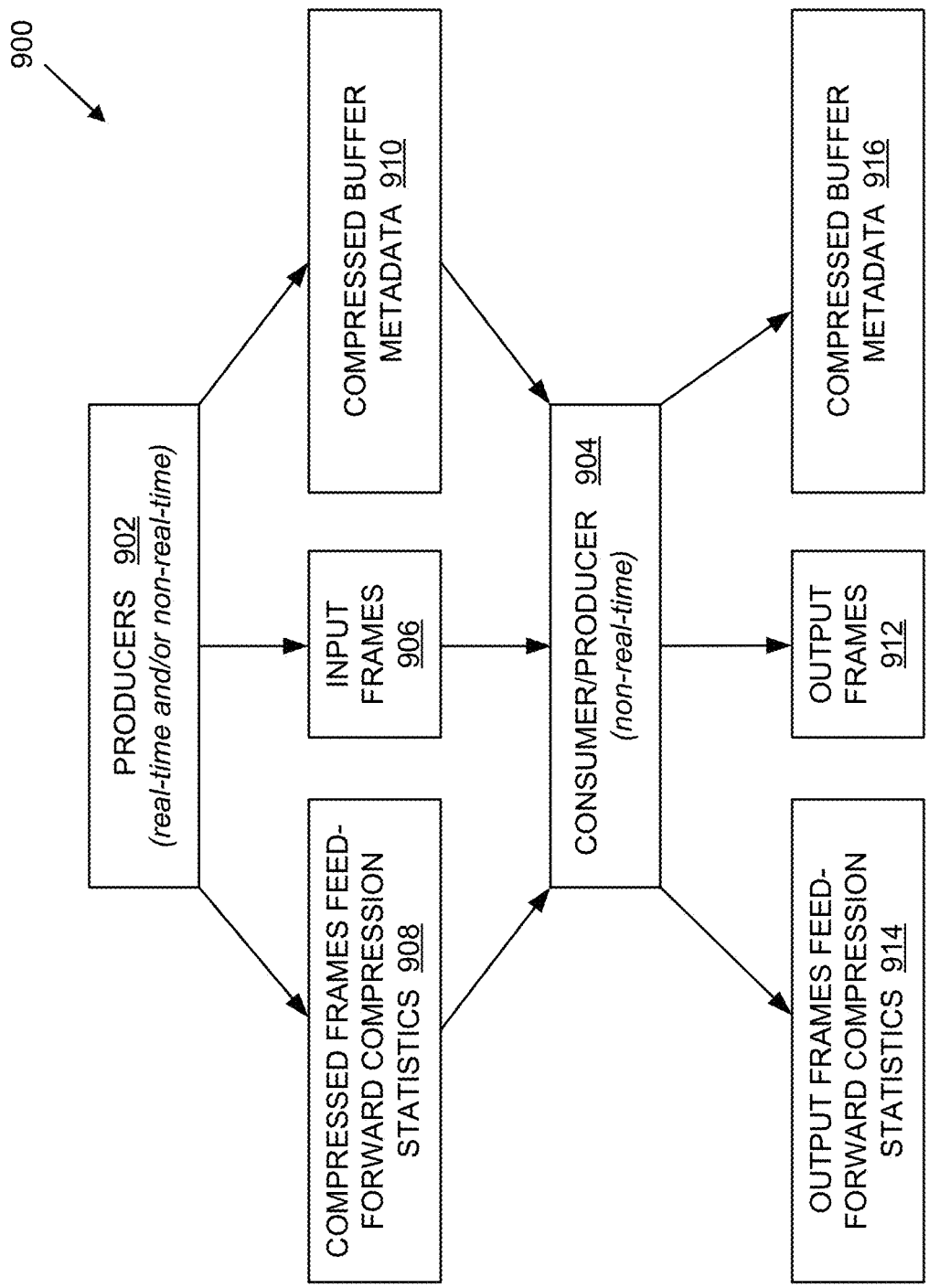
FIG. 7 is a combined block/flow diagram illustrating an embodiment of a method for enabling non-real-time consumer memory clients to accurately vote for memory bandwidth using a feed-forward compression ratio.

Various embodiments of voting algorithms are described below with respect to FIGS. 7-13. FIG. 7 is a combined block/flow diagram illustrating an embodiment of a system 900 for enabling non-real-time consumer memory clients 904 to accurately vote for memory bandwidth using a feed-forward compression ratio. As illustrated in FIG. 7, the producer memory clients 902 may be real-time and/or non-real-time clients. In some embodiments, a non-real-time consumer is a client that may not have a hard deadline for completing its task. In other embodiments, a non-real-time consumer is one that has a series of successive deadlines that it strives to meet but has the flexibility of not meeting earlier deadlines as long as it is able to speed-up and meet later deadlines. An example of such a non-real-time client is a video decoder, which has the flexibility to miss the deadline for decoding one or two successive frames, but in the event of doing so, it may be able to accelerate its operation to meet the deadlines for future frames. If such a video decoder cannot accelerate to meet the deadlines of future frames, then it may have to eventually drop a series of frames, which would cause a user-noticeable glitch in video presentation.

Each producer memory client 902 may generate compressed frames feed-forward compression statistics 908 and compressed buffer metadata 910 for each created input frame 906. The non-real-time consumer memory clients 904 may consume the compressed frames feed-forward compression statistics 908, input frames 906, and compressed buffer metadata 910, as well as produce output frames feed-forward compression statistics 914, output frames 912, and compressed buffer metadata 916. In this manner, the non-real-time consumer memory clients 904 use the a-priori known compressed frame statistics of input frames 906 to dynamically vote for required bandwidth.

Figure 8:
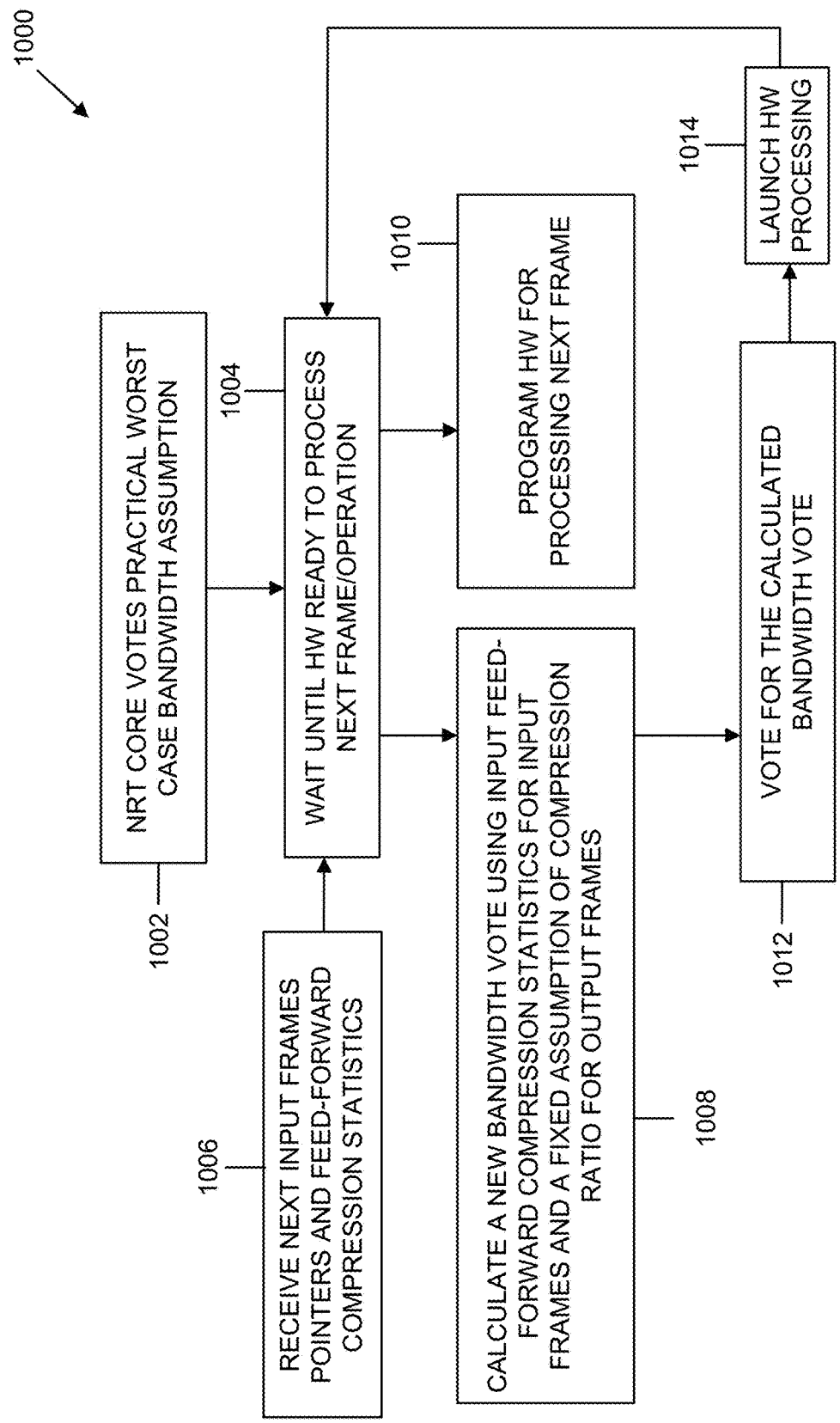
FIG. 8 illustrates an embodiment of a method implemented in the system of FIG. 7 for accurately voting for memory bandwidth using a feed-forward compression ratio.

FIG. 8 illustrates an embodiment of a method 1000 implemented in system 900 for accurately voting for memory bandwidth using a feed-forward compression ratio. The method 1000 starts at block 1002 with the non-real-time (NRT) client voting for a theoretical worst-case (or practical worst-case) bandwidth for all its input and output frames because it may have no prior knowledge of the feed-forward compression statistics of input frames. In block 1006, the NRT client receives the pointers to the next input frame(s) along with the freed forward compression statistics. In block 1004, the NRT client waits until the consumer hardware is ready to process the next frame(s) or operation. In block 1010, the NRT client hardware is programmed for processing the next set of input frame(s). In block 1008, the bandwidth requirements for processing the next set of input frames(s) is computed using the input feed forward statistics 908 of each of the input frames and a fixed assumption for the compression ratio of the output frame(s). Because the compression ratio of the output frame(s) is not known a-priori, a prudent fixed assumption for their compression ratio would be that of the theoretical worst-case (or practical worst-case) compression ratio. This would cause the bandwidth vote due to the output frame(s) being higher than what is typically needed because the compression ratio of output compressed frame(s) is typically higher than that of the theoretical or practical worst-case. However, this guarantees that under no circumstance will the NRT client 904 vote for less bandwidth than it actually consumes. The downside of this prudent decision is that the frequency reduction may not be as low as it may have been if the actual compression ratio of the output frames was accounted for in block 1008. In block 1012, the NRT client 904 votes for the calculated bandwidth. In block 1014, the processing of the next set of input frame(s) is commenced. The method 1000 then returns to block 1004 where it waits for the completion of the current processing steps and the arrival of the pointers to future input frames and associated feed-forward statistics.

Figure 9:
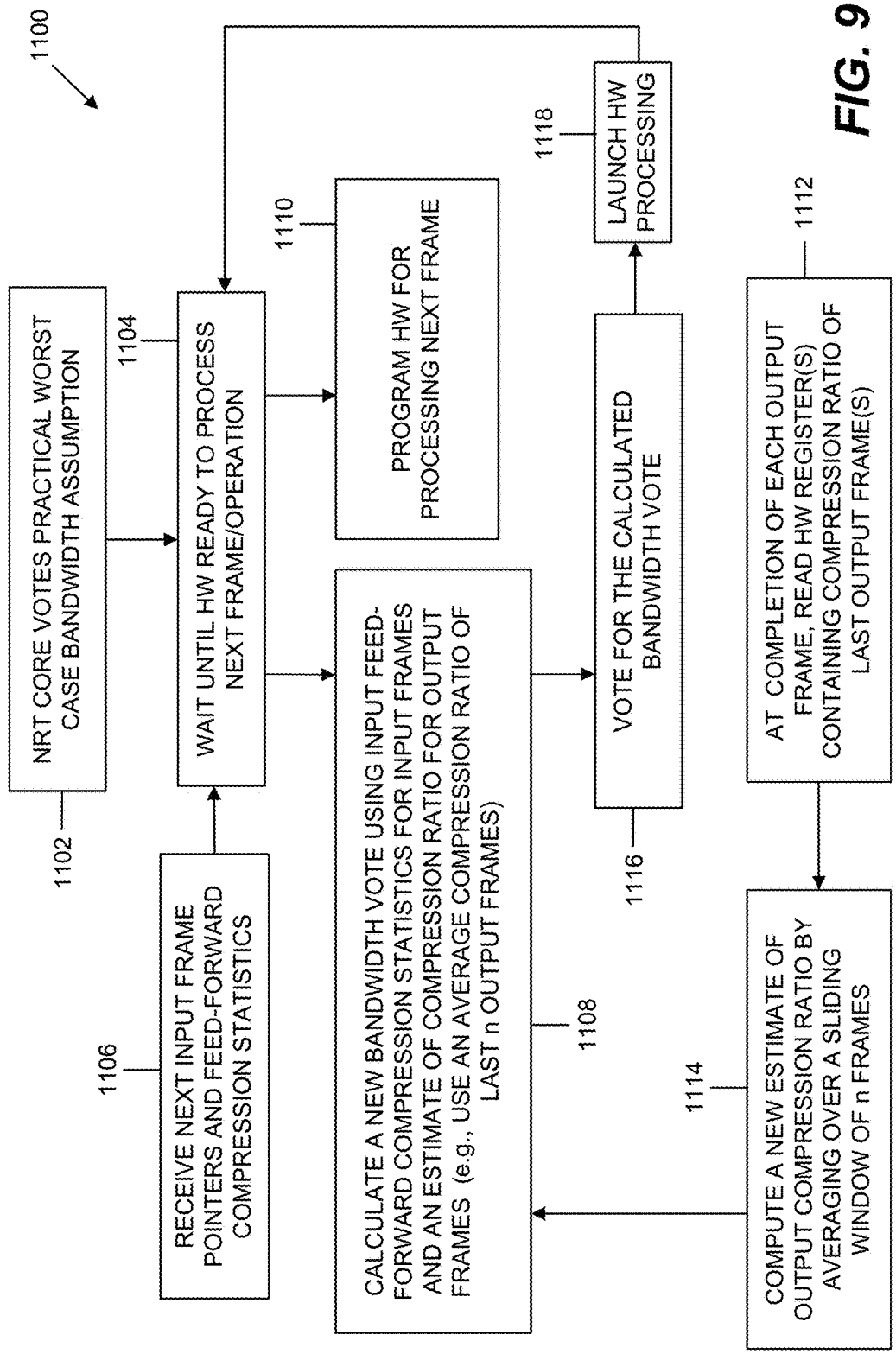
FIG. 9 illustrates another embodiment of a method implemented in the system of FIG. 7 for accurately voting for memory bandwidth using input feed-forward compression statistics and an adaptive estimate of output compression ratio.

To address the conservative vote for bandwidth of output frame(s), FIG. 9 illustrates another embodiment of a method 1100 implemented in the system 900 for accurately voting for memory bandwidth using input feed-forward compression statistics and an adaptive estimate of output compression ratio. The method 1100 starts at block 1102 with the non-real-time (NRT) client voting for theoretical worst-case (or practical worst-case) bandwidth for all its input and output frames because it has no prior knowledge of the feed-forward compression statistics of input frames. In block 1106, the NRT client receives the pointers to the next input frame(s) along with the freed forward compression statistics. In block 1104, the NRT client waits until the consumer hardware is ready to process the next frame(s) or operation. In block 1110, the NRT client hardware is programmed for processing the next set of input frame(s). In block 1108, the bandwidth requirements for processing the next set of input frames(s) is computed using the input feed forward statistics 908 of each of the input frames and an estimate for the compression ratio of the future output frame(s). The estimate for the output frame(s) compression ratio is arrived at through the functions shown in block 1112 and 1114. In block 1112, at the completion of each output frame, the compression ratio achieved for said output frame is read. It should be appreciated that this compression ratio may be present in counters 802 or may be obtained from the feed forward compression statistics 914. In block 1114, a new estimate for the compression ratio of future output frames is computed by calculating the average compression ratio of a sliding window that encompasses the last n output frames. In block 1016, the NRT client 904 votes for the calculated bandwidth. In block 1018, the processing of the next set of input frame(s) is commenced. The method 1100 then returns to block 1104 where it waits for the completion of the current processing steps and the arrival of the pointers to future input frames and associated feed-forward statistics.

Figure 10:
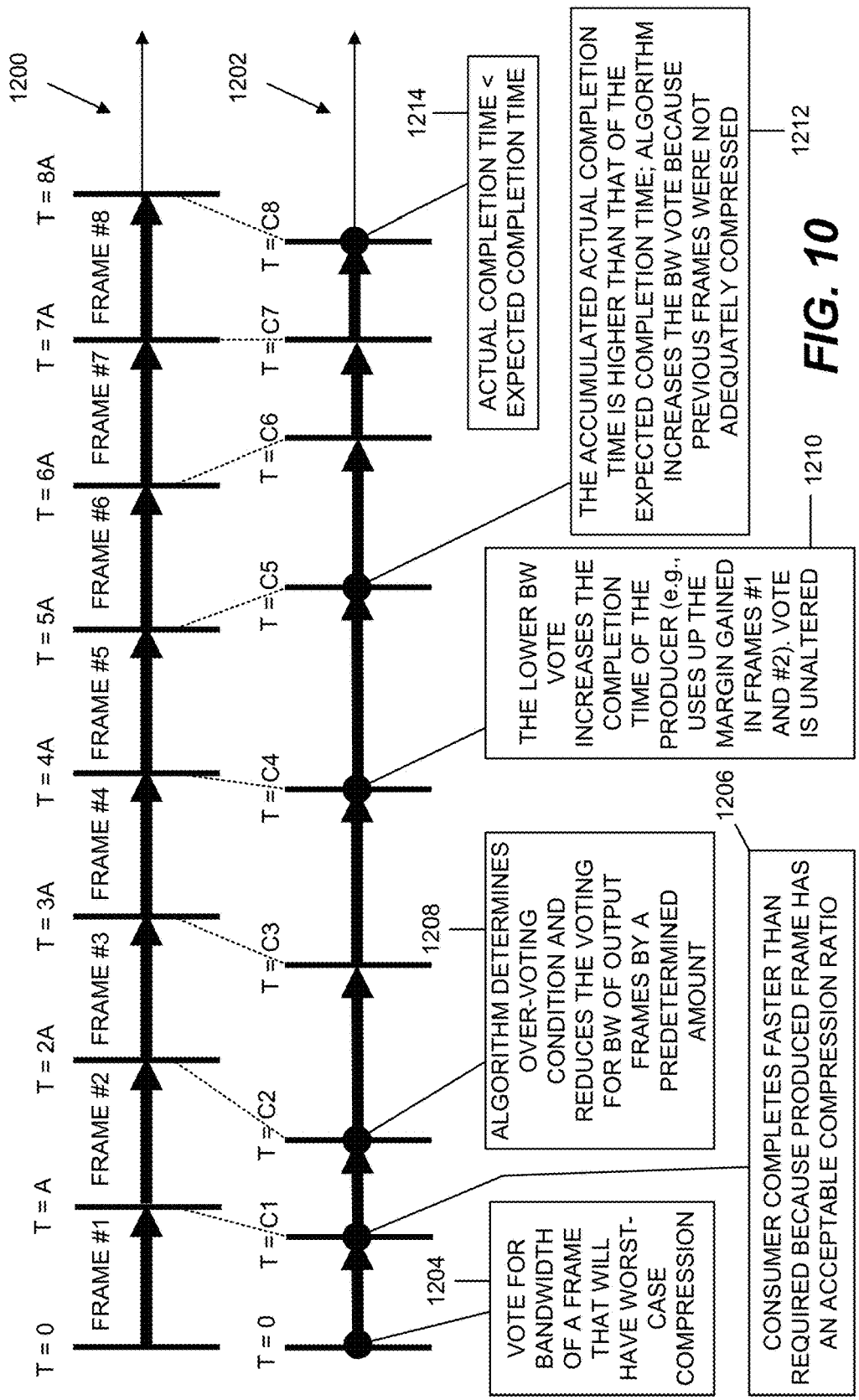
FIG. 10 illustrates an expected vs. actual completion time of a frame output buffer produced by a non-real-time producer memory client.

The downside of using the past bandwidth to predict the future compression ratio of output frames is that there is no explicit closed-loop mechanism to ensure that the non-real-time client 904 will be able to recover in future frames if it had underestimated the bandwidth of output frame(s). FIG. 10 illustrates an alternative approach for setting the bandwidth vote of output frames produced by a non-real-time producer memory client. The time-line 1200 in FIG. 10 shows the target timelines for completion of eight (8) successive frames. Each frame is expected to be processed in a duration of length A. Therefore, the first frame's deadline for completion is A, the second's frame deadline is 2A and so on. Timeline 1202 shows the actual completion time for each successive frame.

As illustrated in FIG. 10, the method starts at block 1204 with the non-real-time (NRT) client voting using input feed-forward compression statistics 908 for input frames and theoretical worst-case (or practical worst-case) bandwidth for its output frames because it has no prior knowledge of compression statistics of output frames. Upon completion of the processing of Frame #1, the consumer subtracts the accumulated actual completion time C1 from the accumulative deadline, A, to obtain an ERROR figure. The vote for the output frame(s) in future processing is determined based on this ERROR figure. If the ERROR is within a predetermined margin (NEGATIVE_MARGIN<ERROR <POSITIVE_MARGIN) then the previous vote for output frames is not changed. This is shown in block 1206. The comparison between actual completion time and the accumulative deadline is repeated at the end of each processing step. In block 1208, the method determines that that the ERROR is less than NEGATIVE_ MARGIN and lowers the vote for the output frames for next processing step. The estimated vote for output frame bandwidth is further reduced at T=C3 because ERROR remains less than NEGATIVE_MARGIN. In block 1210, the ERROR is now within a predetermined margin (NEG- ATIVE_MARGIN<ERROR <POSITIVE_ MARGIN) and therefore the vote is unchanged. In block 1212, the accumulated completion time C5 is larger than the deadline 5A and the ERROR is larger than the POSITIVE_ MARGIN. This results in an increase in the bandwidth vote for output frame(s). A similar situation occurs at completion time C6 where the bandwidth vote for output frames is further increased because the ERROR is larger than the POSITIVE_ MARGIN. At completion time C7, the bandwidth vote for output frames is unchanged because the ERROR is within a predetermined margin (NEGATIVE_MARGIN<ERROR <POSITIVE_MARGIN). Block 1214 represents a point where the accumulated completion time C8 is smaller than the deadline 8A and where the bandwidth vote for output frames can be further reduced.

Figure 12:
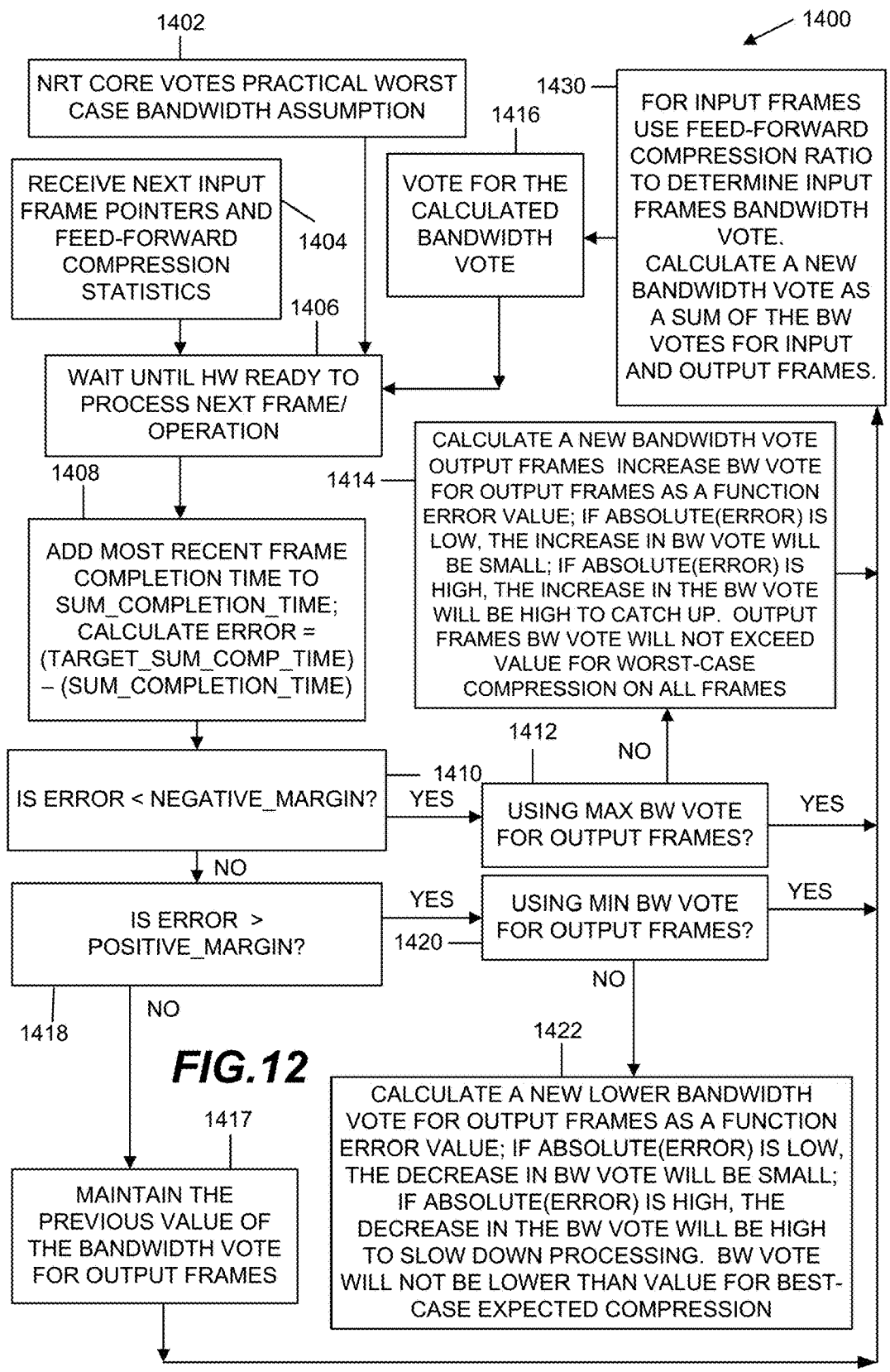
FIG. 12 illustrates an embodiment of a dynamic memory bandwidth voting method that uses feed-forward compression statistics for input frames and completion time data for output frames.

FIG. 12 illustrates an embodiment of a dynamic memory bandwidth voting method that uses feed-forward compression statistics for input frames and completion time data for output frames. The method 1400 starts at block 1402 with the non-real-time (NRT) client voting for theoretical worst-case (or practical worst-case) bandwidth for its output frames. In block 1404, the NRT client receives the pointers to the next input frame(s) along with the freed forward compression statistics. In block 1406, the NRT client waits until the consumer hardware has completed the processing of the previous frame and is ready to process the next frame(s) or operation. In block 1408, the ERROR value is computed as the difference between the accumulated sum of Target completion times and the accumulated sum of the actual completion times. In blocks 1410 and 1418, the value of ERROR is compared to NEGATIVE_MARGIN and POSITIVE_MARGIN, respectively. If NEGATIVE_MARGIN <ERROR<POSITIVE_MARGIN then in block 1430 the new bandwidth vote is computed as the sum of bandwidth votes for the input and output frames. The input frames vote is determined from the feed forward compression ratio and the output frames vote is unchanged from the vote used in previous processing step. In block 1410, when ERROR is smaller than NEGATIVE_MARGIN, indicating that the client is falling behind, the processing proceeds to block 1412 where a test is conducted on whether previous output BW votes is equal to a maximum allowed vote (MAX_BW_VOTE). If true, then output frame(s) vote is set to MAX_BW_VOTE, otherwise, the method 1400 proceeds to block 1414 where the bandwidth vote for the output frames is increased as a function of the ERROR value. In block 1418, when ERROR is larger than POSITIVE_MARGIN, indicating that the client is well ahead of the deadline, the processing proceeds to block 1412 where a test is conducted on whether previous output BW votes is equal to MIN_BW_VOTE. If true, then output frame(s) vote is set to a minimum vote (MIN_BW_VOTE), otherwise, the method 1400 proceeds to block 1422 where the bandwidth vote for the output frames is decreased as a function of the ERROR value. In block 1416, the vote is applied for the bandwidth calculated in block 1430. In block 1440, the consumer hardware is launched.

Figure 11:
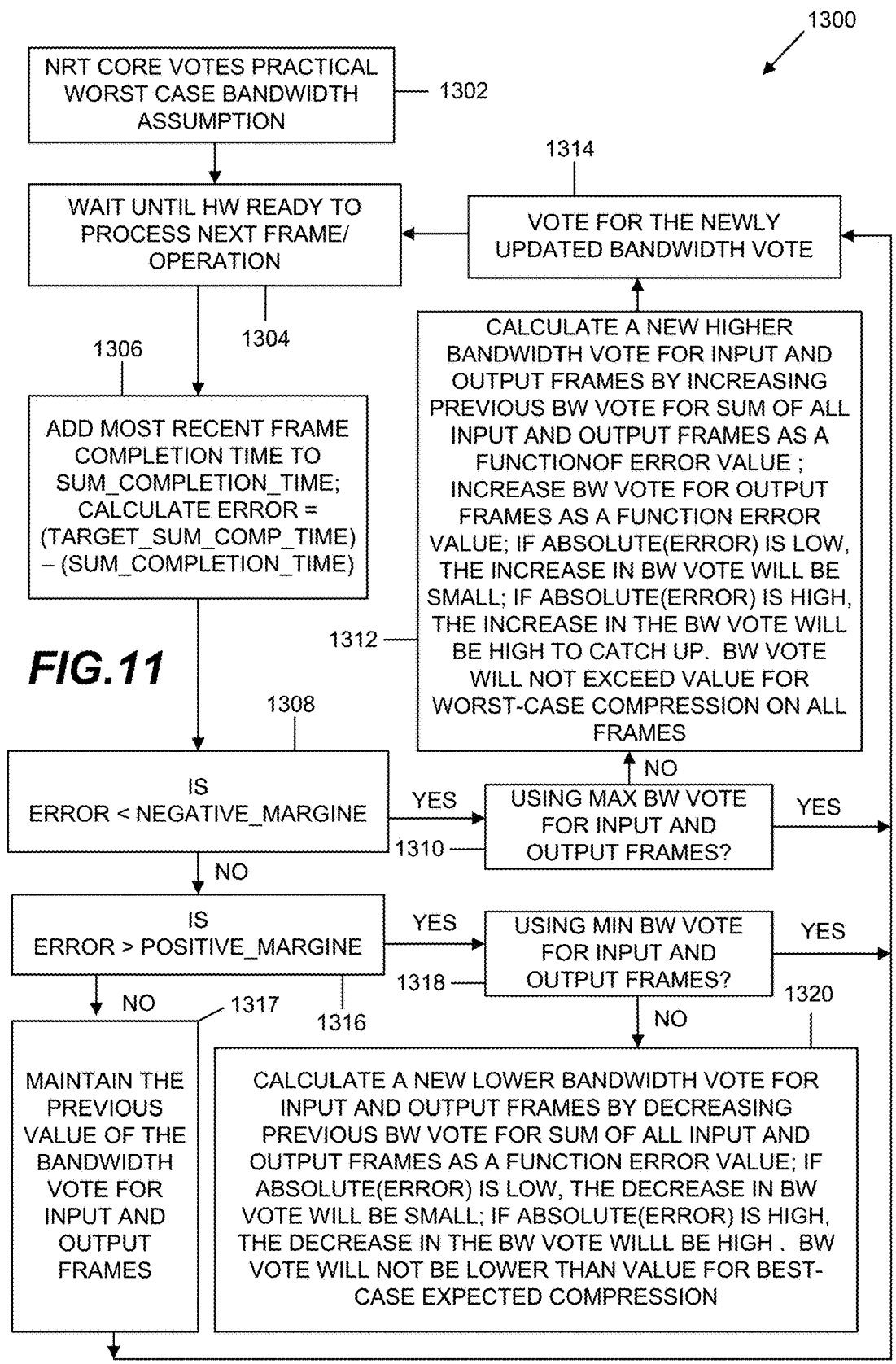
FIG. 11 illustrates another embodiment of a method implemented in the system of FIG. 7 for accurately voting for memory bandwidth using a frame output buffer completion time as illustrated in FIG. 10.
Figure 13:
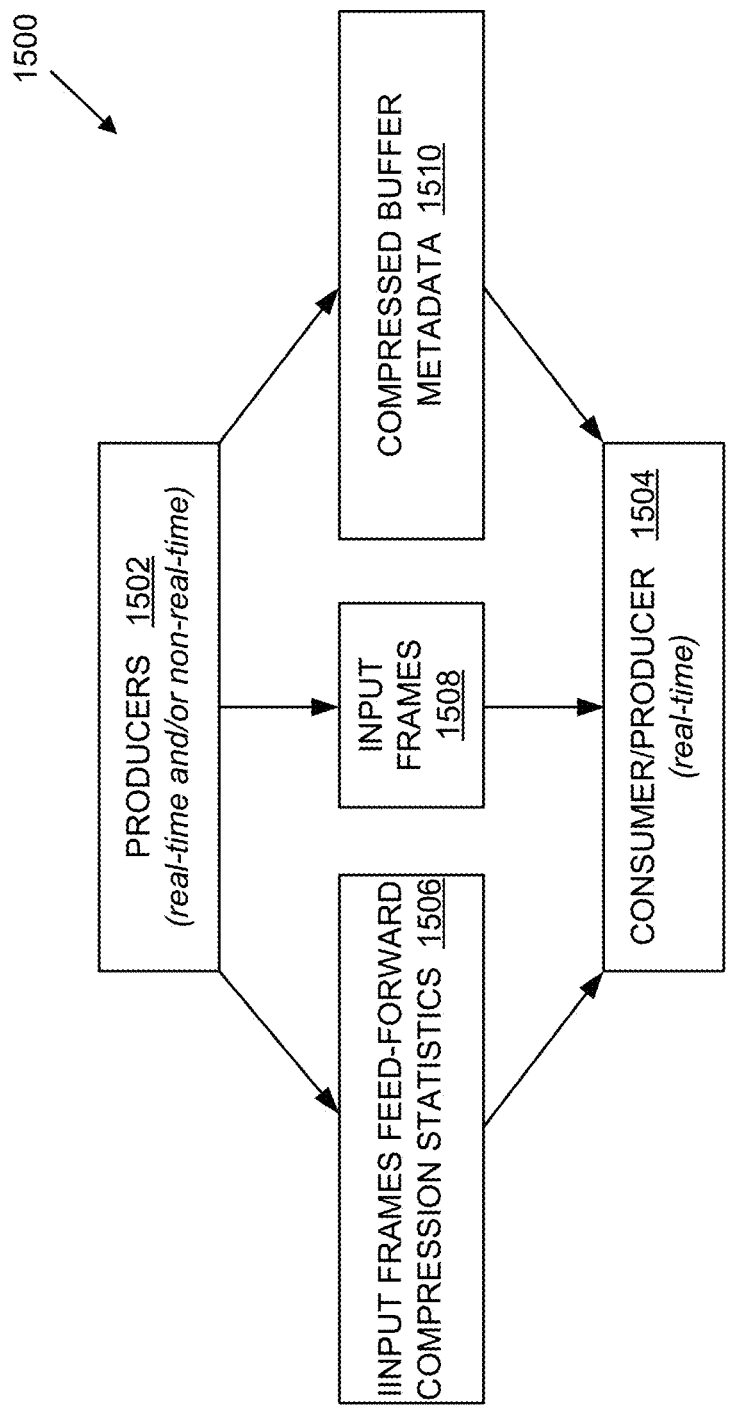
FIG. 13 is a combined block/flow diagram illustrating an embodiment of a method for enabling real-time consumer memory clients to accurately vote for memory bandwidth using input frame feed-forward compression statistics.

FIG. 11 illustrates another embodiment of a method implemented in the system of FIG. 7 for accurately voting for memory bandwidth using a frame output buffer completion time for both the input and output frames. This embodiment is used when feed-forward statistics are not available for input frames FIG. 13 is a combined block/flow diagram illustrating an embodiment of a system 1500 for enabling real-time consumer memory clients 1504 to accurately vote for memory bandwidth using input frame feed-forward compression statistics. A real-time consumer is a client that has a hard deadline for completing its task. If it is deprived of the bandwidth it needs even for a short period of time (e.g., 10s of microseconds) it may cause a system failure such as having noticeable corruption of the system display, a loss of a camera input frame, or an interruption of a data or voice call. As illustrated in FIG. 13, the producer memory clients 1502 may be real-time and/or non-real-time clients. Each producer memory client 1502 may generate input frames feed-forward compression statistics 1506 and compressed buffer metadata 1510 for each created input frame 1506. The real-time consumer memory clients 1504 may consume the input frames feed-forward compression statistics 1506 and compressed buffer metadata 1510 for each input frame 1506.

Figure 14:
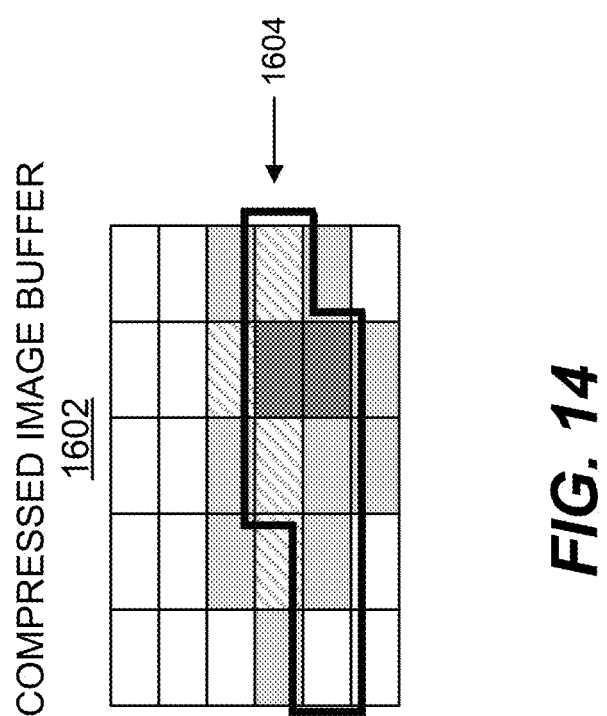
FIG. 14 illustrates an exemplary compressed image buffer with a moving window for enabling a real-time consumer memory client to compute a compression ratio.

FIG. 14 illustrates an exemplary compressed image buffer 1602 with a moving window 1604 for enabling the real-time consumer memory client 1504 (FIG. 13) to compute a compression ratio. Each producer of a compressed frame (producer memory client(s) 1502) may compute the compression ratio over the moving window 1604 and convey this as part of the compressed buffer metadata to the real-time consumer memory clients 1504. The compression ratio may comprise, for example, the lowest compression level seen over the moving window 1604 and/or the average compression ratio for the frames. It should be appreciated that the size and shape of the moving window 1604 may vary for the real-time consumer memory client(s) 1504. Furthermore, the moving window 1604 may not be the same shape for consumers/producers based on access pattern(s).

In some embodiments, a software component may parse the compressed buffer metadata 1510 based on the consumer access pattern and generate a worst-case compression ratio over the moving window 1604. The real-time consumer memory client 1504 may then vote for an input bandwidth as follows: input bandwidth vote=(input bandwidth without compression)/(compression ratio of worst-case moving window 1604). In other embodiments, instead of using a moving window 1604, an average compression ratio for the input buffer may be used plus an additional vote that is heuristically defined to represent a number of poorly compressed units.

Figure 15:
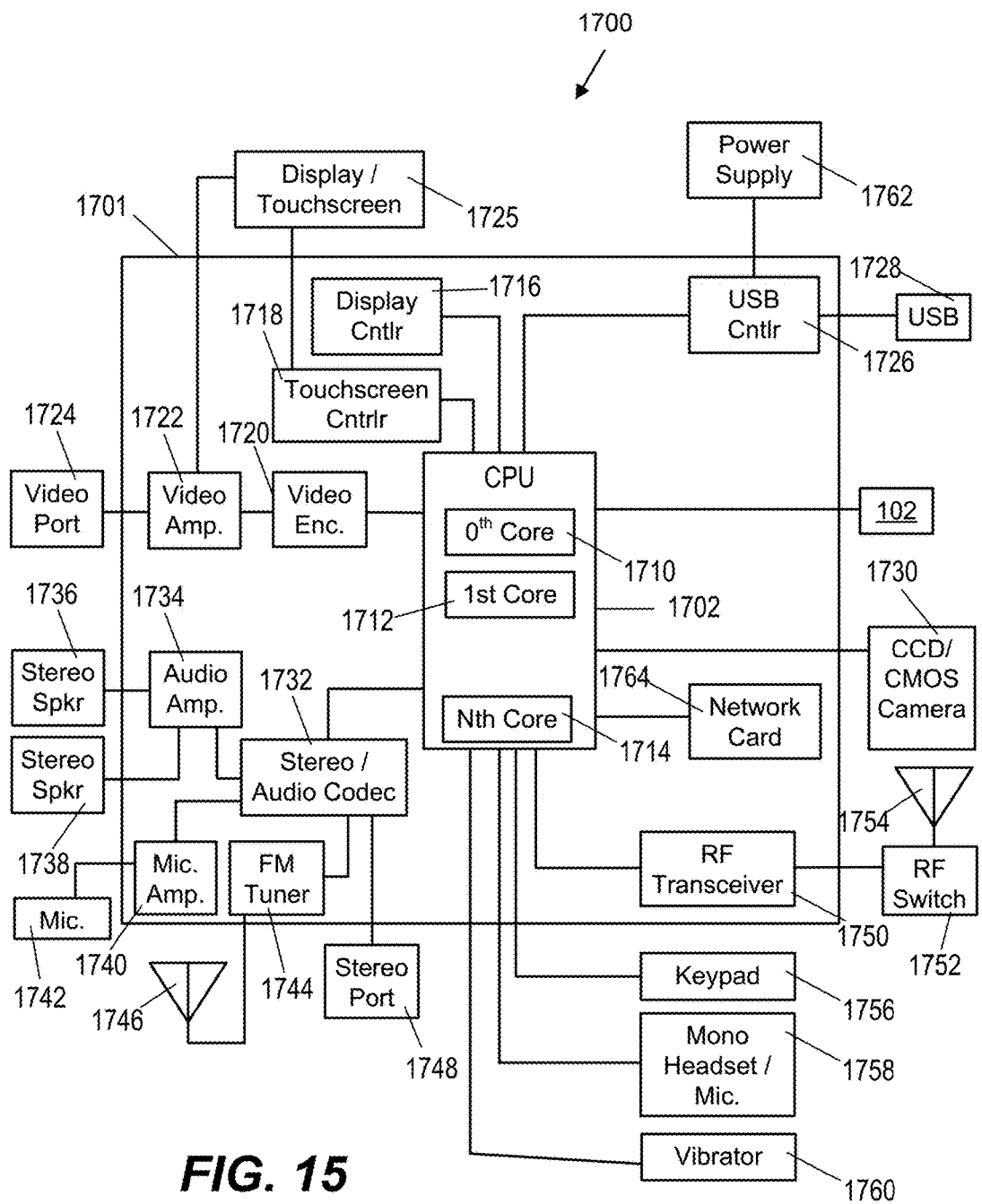
FIG. 15 is a block diagram of an exemplary embodiment of a portable communication device for incorporating the systems and methods of FIGS. 1-14.

FIG. 15 is a block diagram of an exemplary embodiment of a portable computing device (PCD) 1700 that may comprise a mobile phone for incorporating the systems and methods described above. Besides a mobile phone, the PCD 1700 may also comprise a personal digital assistant (PDA), a pager, a tablet, a smartphone, a navigation device, and a hand-held computer with a wireless connection or link.

It will be readily appreciated that certain components of the system 100 are included on the SoC 1701. The SoC 1701 may include a multicore CPU 1702. The multicore CPU 1702 may include a zeroth core 1710, a first core 1712, and an Nth core 1714. One of the cores may comprise, for example, a graphics processing unit (GPU) with one or more of the others comprising the CPU.

A display controller 1716 and a touch screen controller 1718 may be coupled to the CPU 1702. In turn, the touch screen display 1725 external to the SoC 1701 may be coupled to the display controller 1716 and the touch screen controller 1718.

FIG. 17 further shows that a video encoder 1720, a phase alternating line (PAL) encoder, a sequential color a memoire (SECAM) encoder, or a national television system(s) committee (NTSC) encoder, is coupled to the multicore CPU 1702. Further, a video amplifier 1722 is coupled to the video encoder 1720 and the touch screen display 1225. Also, a video port 1724 is coupled to the video amplifier 1722. As shown in FIG. 17, a universal serial bus (USB) controller 1726 is coupled to the multicore CPU 1702. Also, a USB port 1728 is coupled to the USB controller 1726. DRAM 102 may be coupled to the CPU 1702 residing on SoC 1701.

Further, as shown in FIG. 17, a digital camera 1730 may be coupled to the multicore CPU 1702. In an exemplary aspect, the digital camera 1730 is a charge-coupled device (CCD) camera or a complementary metal-oxide semiconductor (CMOS) camera.

As further illustrated in FIG. 17, a stereo audio coder-decoder (CODEC) 1732 may be coupled to the multicore CPU 1702. Moreover, an audio amplifier 1734 may be coupled to the stereo audio CODEC 1732. In an exemplary aspect, a first stereo speaker 1736 and a second stereo speaker 1738 are coupled to the audio amplifier 1734. A microphone amplifier 1740 may be also coupled to the stereo audio CODEC 1732. Additionally, a microphone 1742 may be coupled to the microphone amplifier 1740. In a particular aspect, a frequency modulation (FM) radio tuner 1744 may be coupled to the stereo audio CODEC 1732. Also, an FM antenna 1746 is coupled to the FM radio tuner 1744. Further, stereo headphones port 1748 may be coupled to the stereo audio CODEC 1732.

FIG. 17 further illustrates that a radio frequency (RF) transceiver 1750 may be coupled to the multicore CPU 1702. An RF switch 1752 may be coupled to the RF transceiver 1750 and an RF antenna 1754. A keypad 1756 may be coupled to the multicore CPU 1702. Also, a mono headset with a microphone 1758 may be coupled to the multicore CPU 1702. Further, a vibrator device 1760 may be coupled to the multicore CPU 1702.

FIG. 17 also shows that a power supply 1762 may be coupled to the SoC 1701. In a particular aspect, the power supply 1762 is a direct current (DC) power supply that provides power to the various components of the PCD 1700 that require power. Further, in a particular aspect, the power supply is a rechargeable DC battery or a DC power supply that is derived from an alternating current (AC) to DC transformer that is connected to an AC power source.

The PCD 1700 may also include a network card 1764 that may be used to access a data network (e.g., a local area network, a personal area network, or any other network). The network card 1764 may be a Bluetooth network card, a WiFi network card, a personal area network (PAN) card, a personal area network ultra-low-power technology (PeANUT) network card, a television/cable/satellite tuner, or any other network card well known in the art. Further, the network card 1764 may be incorporated into a chip. The network card 1764 may be a full solution in a chip, and may not be a separate network card 1764.

As illustrated in FIG. 17, the touch screen display 1725, the video port 1724, the USB port 1728, the camera 1730, the first stereo speaker 1736, the second stereo speaker 1738, the microphone 1742, the FM antenna 1746, the stereo headphones 1748, the RF switch 1752, the RF antenna 1754, the keypad 1756, the mono headset 1758, the vibrator 1760, and the power supply 1762 may be external to the SoC 1701.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Alternative exemplary embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for controlling memory frequency, the method comprising:
   a first memory client producing a compressed digital image frame from a digital video signal and compression statistics related to the compressed digital image frame, the compressed digital image frame comprising a plurality of compressed units of a variable size, and the compression statistics defining a variable compression ratio for each of the plurality of compressed units in the compressed digital image frame, wherein the compressed digital image frame and the compression statistics are capable of supporting a lossless digital image compression algorithm and a lossy digital image compression algorithm;
   storing the compressed digital image frame and the compression statistics in a compressed data buffer in a memory device;
   generating a memory bandwidth vote with a second memory client based on the stored compression statistics for reading the compressed image frame from the compressed data buffer, the memory bandwidth vote comprising an amount of memory bandwidth needed by the second client to reproduce the digital video signal based on the compression statistics;
   sending the memory bandwidth vote from the second memory client to a clock controller; and adjusting a frequency setting of one of the memory device, a memory controller, and a system interconnect with the clock controller, the clock controller aggregating the memory bandwidth vote from the second memory client with one or more additional memory bandwidth votes and the clock controller converting the aggregated memory bandwidth votes to the adjusted frequency setting, the adjusted frequency setting enabling the second memory client to read the compressed digital image frame from the compressed data buffer at a level which conserves power and which allows for reproduction of the digital video signal.

2. The method of claim 1, wherein the first and second memory clients comprise one of a real-time processor and a non-real-time processor.

3. The method of claim 2, wherein one or more of the real-time processor and the non-real-time processor operate with a variable bandwidth.

4. The method of claim 1, wherein the memory device comprises a dynamic random access memory.

5. The method of claim 4, wherein the first and second memory clients reside on a system on chip (SoC) electrically coupled to the DRAM.

6. A system for controlling memory frequency, the system comprising:
   means for producing a compressed digital image frame from a digital video signal and compression statistics related to the compressed digital image frame, the compressed digital image frame comprising a plurality of compressed units of a variable size, and the compression statistics defining a variable compression ratio for each of the plurality of compressed units in the compressed digital image frame, wherein the compressed digital image frame and the compression statistics are capable of supporting a lossless digital image compression algorithm and a lossy digital image compression algorithm;
   means for storing the compressed digital image frame and the compression statistics in a compressed data buffer in a memory device;
   means for generating a memory bandwidth vote with a second memory client based on the stored compression statistics for reading the compressed image frame from the compressed data buffer, the memory bandwidth vote comprising an amount of memory bandwidth needed by the second client to reproduce the digital video signal based on the compression statistics;
   means for sending the memory bandwidth vote from the second memory client to a clock controller; and
   means for adjusting a frequency setting of one of the memory device, a memory controller, and a system interconnect with the clock controller, where the clock controller aggregates the memory bandwidth vote from the second memory client with one or more additional memory bandwidth votes and converts the aggregated memory bandwidth votes to the adjusted frequency setting, the adjusted frequency setting enabling the second memory client to read the compressed digital image frame from the compressed data buffer at a level which conserves power and which allows for reproduction of the digital video signal.

7. The system of claim 6, wherein the second memory client comprises one of a real-time processor and a non-real-time processor.

8. The system of claim 6, wherein the means for producing the compressed digital image frame from a digital video signal and the compression statistics comprises a real-time processor.

9. The system of claim 6, wherein the memory device comprises a dynamic random access memory.

10. The system of claim 6, wherein clock controller comprises a software driver.

11. A non-transitory computer readable medium embodied in a memory and executable by a processor for controlling memory frequency, the non-transitory computer readable medium comprising logic configured to:
    have a first memory client to produce a compressed digital image frame from a digital video signal and compression statistics related to the compressed digital image frame, the compressed digital image frame comprising a plurality of compressed units of a variable size, and the compression statistics defining a variable compression ratio for each of the plurality of compressed units in the compressed digital image frame, wherein the compressed digital image frame and the compression statistics are capable of supporting a lossless digital image compression algorithm and a lossy digital image compression algorithm;
    store the compressed digital image frame and the compression statistics in compressed data buffer in a memory device;
    generate a memory bandwidth vote with a second memory client based on the stored compression statistics for reading the compressed image frame from the compressed data buffer, the memory bandwidth vote comprising an amount of memory bandwidth needed by the second client to reproduce the digital video signal based on the compression statistics;
    send the memory bandwidth vote from the second memory client to a clock controller; and
    adjust a frequency setting of one of the memory device, a memory controller, and a system interconnect with the clock controller, the clock controller aggregating the memory bandwidth vote from the second memory client with one or more additional memory bandwidth votes and the clock controller converting the aggregated memory bandwidth votes to the adjusted frequency setting, the adjusted frequency setting enabling the second memory client to read the compressed digital image frame from the compressed data buffer at a level which conserves power and which allows for reproduction of the digital video signal.

12. The non-transitory computer readable medium of claim 11, wherein the second memory client comprises one of a real-time processor and a non-real-time processor.

13. A system comprising:
    a first memory client configured to produce a compressed digital image frame and compression statistics related to the compressed digital image frame, the compressed digital image frame comprising a plurality of compressed units of a variable size, and the compression statistics defining a variable compression ratio for each of the plurality of compressed units in the compressed digital image frame, wherein the compressed digital image frame and the compression statistics are capable of supporting a lossless digital image compression algorithm and a lossy digital image compression algorithm;
    a memory device for storing the compressed digital image frame and the compression statistics in a compressed data buffer;

a second memory client generating a memory bandwidth vote based on the stored compression statistics for reading the compressed image frame from the compressed data buffer, the memory bandwidth vote comprising an amount of memory bandwidth needed by the second client to reproduce the digital video signal based on the compression statistics; the second memory client sending the memory bandwidth vote to a clock controller; and the clock controller adjusting a frequency setting of one of the memory device, a memory controller, and a system interconnect, the clock controller aggregating the memory bandwidth vote from the second memory client with one or more additional memory bandwidth votes and the clock controller converting the aggregated memory bandwidth votes to the adjusted frequency setting, the adjusted frequency setting enabling the second memory client to read the compressed digital image frame from the compressed data buffer at a level which conserves power and which allows for reproduction of the digital video signal.

14. The system of claim 13, wherein the first and second memory clients comprise one of a real-time processor and a non-real-time processor.

15. The system of claim 13, wherein the memory device comprises a dynamic random access memory.

16. The system of claim 15, wherein the first and second memory clients reside on a system on chip (SoC) electrically coupled to the dynamic random access memory.

17. The system of claim 13, wherein the clock controller further comprises a memory clock manager configured to adjust a frequency or voltage setting of the memory device based on the compression statistics.

* * * * *